Figure 1:
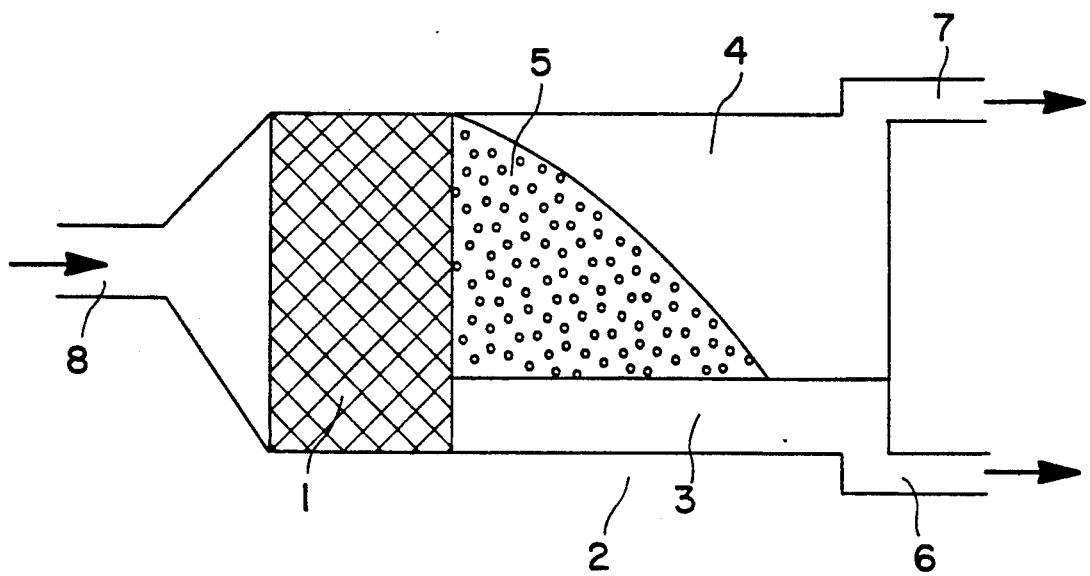

United States Patent [19]
Assmann et al.

[11] Patent Number: 5,225,084
[45] Date of Patent: Jul. 6, 1993

[54] PROCESS FOR THE SEPARATION OF TWO LIQUID IMMISCIBLE ORGANIC COMPONENTS USING A FIBRE BED AS A COALESCENCE AID

[75] Inventors: Georg Assmann, Juechen; Bernhard Gutsche, Hilden; Wilhelm Johannisbauer, Erkrath; Richard Ridinger, Duesseldorf, all of Fed. Rep. of Germany; Jean Rigal; René Armengaud, both of Saint-Martory, France; Bernard Cormary, Salies du Gare, France

[73] Assignee: Henkel Kommanditgesellschaft auf Aktien, Duesseldorf, Fed. Rep. of Germany

[21] Appl. No.: 761,959

[22] PCT Filed: Mar. 31, 1990

[86] PCT No.: PCT/EP90/00514
§ 371 Date: Oct. 17, 1991
§ 102(e) Date: Oct. 17, 1991

[87] PCT Pub. No.: WO90/11810
PCT Pub. Date: Oct. 18, 1990

[30] Foreign Application Priority Data
Apr. 8, 1989 [DE] Fed. Rep. of Germany ....... 3911538

[51] Int. Cl.$^5$ ............................................. B01D 17/022
[52] U.S. Cl. .................................... 210/649; 210/690; 210/800; 210/307
[58] Field of Search ................ 210/690, 307, 259, 800, 210/804, 649

[56] References Cited
U.S. PATENT DOCUMENTS
3,894,943 7/1975 Hartmann et al. ............... 210/307 X Primary Examiner—Frank Spear
Attorney, Agent, or Firm—Ernest G. Szoke; Wayne C. Jaeschke; Daniel S. Ortiz

[57] ABSTRACT

A process for the separation, by sedimentation, of at least one liquid organic component dispersed in a liquid containing mainly organic materials, this organic component and the remaining liquid exhibiting a difference in density. In order to reduce considerably the standing time, it is proposed that the liquid be passed before sedimentation through a fiber bed that the organic component and the remaining liquid have different surface tensions with respect to the fiber bed, that the temperature of the liquid and the concentration of the organic component to be separated are such that, in the equilibrium state, at least two liquid phases form, and that the rate of flow of the liquid through the fiber bed lies below a maximum value dependent on the surface tension of the organic component with respect of the fiber bed and on the difference in density and surface tension between the remaining liquid and the organic component.

17 Claims, 1 Drawing Sheet

PROCESS FOR THE SEPARATION OF TWO LIQUID IMMISCIBLE ORGANIC COMPONENTS USING A FIBRE BED AS A COALESCENCE AID

This invention relates to a process for the separation of at least one liquid organic component dispersed in a liquid primarily containing organic constituents by sedimentation of the organic component, the organic component and the residual liquid differing from one another in density.

Both here and in the following, the term "liquid" means the liquid as a whole before separation, the term "organic component" means only the constituent dispersed in droplet form, the term "constituents" means all the constituents of the liquid to be treated and the term "residual liquid" means the liquid after separation of the organic component.

Two organic liquids which are not completely miscible with one another often have to be separated from one another. The two liquids are whirled around and mixed by pumps, pipes and apparatus so intensively that one liquid is finely dispersed in the other. The two liquids may be separated by sedimentation of more or less large drops. Vertical or horizontal separators are used for this purpose. Where static separators, for example decanters, are used, very long residence times of up to 14 days are required. To shorten this time, it has already been proposed to use separators following the static separators, for example for the reaction product obtained after a transesterification reaction (cf. Seifen-Öle-Fette-Wachse, Vol. 114, 1988, page 596, 2nd paragraph and FIG. 3). However, the use of such separators does involve operational problems which occur in cases of variations in throughput, raw material quality and raw materials, for example oils having different chain lengths, different degrees of saturation and different impurities, and in the event of temperature fluctuations. Further disadvantages of such a proposal are high investment, maintenance and energy costs.

In another process for the separation of petroleum-water mixtures or kerosene-water mixtures known from DE-OS 23 03 990 and GB-PS 1,409,045, a coalescence aid is introduced before sedimentation. Coalescence processes such as these are also known from DE 31 11 554 A1 and DE 27 55 837 A1. This coalescence aid may assume different forms, for example it may be in the form of wire nets, filaments or fibers. It is important in this regard that the surface of the coalescence aid should differ in its wettability in respect of the two liquids. This wettability is determined by the interfacial tension of the liquid with respect to the coalescence aid. Where known coalescence aids of this type are used for the separation of one organic liquid from another organic liquid under the described typical working conditions known for the separation of water from organic substance or organic substance from water, it has been found that the coalescence aid, particularly when used to separate immiscible oleochemical substances, has no effect on the coalescence of the dispersed organic component.

The problem addressed by the present invention is to provide a process of the type mentioned at the beginning by which the residence time hitherto required is considerably reduced.

According to the invention, the solution to this problem is characterized in that, before sedimentation, the liquid flows through a fiber bed, in that the organic component and the residual liquid have different interfacial tensions with respect to the material of the fiber bed, in that the liquid has such a temperature and such a concentration of the organic component to be separated off that at least two liquid phases are formed in equilibrium. The rate of flow of the mixture through the fiber bed is determined by the wettability of the fibers and by the interfacial tension of the two liquids. It must be determined by tests.

It has surprisingly been found that, where fiber filters are used as the coalescence aid and where narrow operating ranges are maintained, the dispersed droplets of the organic component coalesce A successful result is crucially determined by the choice of the rate of flow in dependence upon the interfacial tensions with the fiber bed and between the liquids. According to the present invention, the necessary flow rates are considerably lower than in the known coalescence processes At the rates of flow used in the present invention, DE-OS 23 03 990 for example refers to an absence of effect of the coalescence aid. However, it is precisely these flow rates which produce a successful result in the separation of the dispersed organic component from the remaining organic liquid.

It is of particular advantage if the organic constituents of the liquid are oleochemical substances such as, for example, glycerides, esters and fatty acids In this case, it is of particular advantage if the organic component to be separated is glycerol. The process according to the invention has been particularly successful in the separation of glycerol from mixtures of fatty acid alkyl ester and glycerol and particularly from a mixture of fatty acid methyl ester and glycerol.

In the present invention, the dispersed droplets of the organic component adhere to the individual fibers. While the liquid flows past the fibers, the other droplets dispersed therein grow through coalescence on the fibers. The drops which have increased in size offer a greater resistance to the flowing liquid and, hence, move along the fibers to the last fiber layer When the drops reach a certain minimum size, they are displaced from this last fiber layer by following drops and are entrained by the main phase flow. By virtue of their larger diameter, these large drops sediment considerably more quickly in the following separator than would be the case without the fiber filter. The two liquids, the organic component and the residual liquid, may be continuously run off after the separator.

By comparison with the prior art, the liquids of the process according to the invention lead to completely different operating conditions. Accordingly, it is proposed in particular that the rate of flow through the fiber bed should be between 0.1 and 3.0 mm/s and preferably between 0.2 and 1.0 mm/s. Flow rates such as these are unusual for the separation of water and oil, as shown in DE-OS 23 03 990 (Table 1 on page 6 and page 15, 1st paragraph). In the known process, the flow rates are of the order of 10 mm/s. In this prior art, flow rates of the order of 0.5 mm/s mean that the coalescence aid has hardly any effect on the liquid. However, it is precisely at flow rates of this order that the present invention operates.

If the invention is applied to oleochemical products, the temperature of the liquid is selected within its flow range so that the solubility of the component to be separated is minimal. In general, these are very low temperatures. It is important in this regard to ensure that the liquid is still able to flow over the entire range of the fiber filter.

In addition, a fiber bed containing disordered fibers is proposed because it is considerably more economical than a fiber bed of ordered fibers, but still works as well.

A compressed fiber bed containing metal or glass fibers has proved particularly successful. In addition, untreated glass fibers in the fiber bed are advantageous.

The fibers of the fiber bed should be between 1 and 50 micrometers and preferably between 1 and 5 micrometers in diameter. Particularly good coalescence of the dispersed liquid organic component was achieved in this range.

In addition, a packing density of the fiber bed of 3 to 100 mm in the direction of flow is advantageous.

The process is particularly economical if it is carried out after static separation in a standard separator (decanter) for coarse separation of the component. Through such rapid and inexpensive preliminary separation, it is possible for example to reduce the glycerol content of fatty acid methyl ester from around 10–15% to approximately 1% without significant effort. The residue of approximately 1% to near the solubility limit (approx. 0.1%) may then be removed by means of the fiber filter and the sedimentation separator.

According to the invention, the sedimentation by which coalescence is followed may be carried out in a standard separator unit and even in any other separators. For example, vertical or horizontal separators may be used for this purpose.

According to the invention, it is particularly important to keep to a temperature range, generally a particularly low temperature. However, this operating temperature is limited by the solidification temperature of the liquid constituents and by the dependence on temperature of the solubility behavior. The temperature is selected so that the solubility of the residual component in the liquid is particularly low.

The invention is illustrated by the following example with reference to the sole Figure.

FIG. 1 diagrammatically illustrates the construction of a separator with a preceding fiber filter.

The mixture of methyl ester and glycerol flows into the separator from the left. The heavier glycerol is finely dispersed in the form of small droplets in the residual liquid methyl ester. In this example, the liquid contains 1.5% glyerol, the liquid organic component to be separated off. In the absence of a fiber filter, the glycerol would only collect in a lower, heavy phase after a few days in the static separator. In the present example, the liquid first flows through a fiber bed (1) consisting of a layer of glass fibers arranged in a cartridge. These fibers have a diameter of 1 micrometer; in another example, they have a diameter of 5 micrometers. The fiber bed has a cross-sectional area of 0.5 m².

The liquid, the mixture of methyl ester and glycerol with typical components from the transesterification reaction, such as soaps for example, flows through the cartridge containing the fiber bed (1) at a rate of 0.3 mm/s at an operating temperature of 20° to 40° C. The glycerol drops emerging from the fiber bed (1) sediment to the bottom in the region (5). The fatty acid methyl ester phase (4), the residual liquid, has a rate of flow of 1 to 3 mm/s behind the fiber bed (1) in the sedimentation range. At temperatures of 20° C., the glycerol could be separated from the fatty acid methyl ester to a residue of 0.1%. However, the exact optimal temperature depends on the type of methyl ester and the additional components and can be determined by tests.

The lower, heavier glycerol phase (3), the organic component, is removed through the outlet (6) while the upper, lighter residual liquid (4), the fatty acid methyl ester, is removed through the outlet (7). The arrows indicate the direction of flow.

We claim:

1. A process for the separation of a dispersion comprising glycerol dispersed in a residual liquid containing oleochemical constituents by sedimentation of the glycerol, to provide the residual liquid, the glycerol and the residual liquid differing from one another in density, which process comprises: passing the dispersion through a fiber bed at a flow velocity of from 0.1 mm/sec to 3.0 mm/sec, wherein the organic component and the residual liquid have different interfacial tensions with respect to the fiber fed, at a temperature and a concentration of the glycerol, that at least two liquid phases are formed.

2. A process of claim 1, wherein the glycerol is separated from a dispersion of glycerol in a fatty acid alkyl ester.

3. A process of claim 2 wherein the flow velocity through the fiber bed is from 0.2 to 1.0 mm/sec.

4. A process of claim 2 wherein the flow velocity through the fiber bed is from 0.2 to 1.0 mm/sec.

5. A process of claim 2 wherein fibers in the fiber bed are from 1.0 to 50 micrometers in diameter.

6. A process of claim 5 wherein the fiber bed is from 3 mm to 100 mm in the direction of flow.

7. A process of claim 6 wherein the fibers in the fiber bed comprise untreated glass fibers.

8. A process of claim 7 wherein the fibers are from 1 to 5 micrometers in diameter.

9. A process of claim 8 wherein the flow velocity through the fiber bed is from 0.2 to 1.0 mm/sec.

10. A process of claim 1 wherein the temperature of the dispersion is selected so that the solubility of the glycerol in the residual liquid is minimal.

11. A process of claim 1 wherein the fiber bed comprises random fibers.

12. A process of claim 11 wherein the fibers in the fiber bed comprise glass fibers.

13. A process of claim 12 wherein the fibers are from 1 to 5 micrometers in diameter.

14. A process of claim 1 wherein the fiber bed comprises a compressed bed containing at least one of metal and glass fibers.

15. A process of claim 1 wherein the fiber bed comprises untreated glass fibers.

16. A process of claim 1 wherein the diameter of the fibers of the fiber of the fiber bed is between 1 and 50 micrometers.

17. A process of claim 1 wherein the fiber fed is from 3 to 100 mm in the direction of flow.

* * * * *